United States Patent [19]
Adair

[11] Patent Number: 5,871,837
[45] Date of Patent: Feb. 16, 1999

[54] METHOD OF FIXING AN IMAGE TO A RIGID SUBSTRATE

[75] Inventor: Paul C. Adair, Germantown, Wis.

[73] Assignee: Brady USA, Milwaukee, Wis.

[21] Appl. No.: 499,469

[22] Filed: Jul. 7, 1995

Related U.S. Application Data

[63] Continuation-in-part of Ser. No. 116,341, Sep. 3, 1993, abandoned.

[51] Int. Cl.$^6$ ..................................................... B41M 5/25
[52] U.S. Cl. ......................... 428/206; 156/230; 156/234; 156/235; 156/236; 156/240; 156/247; 430/18; 430/107; 430/126
[58] Field of Search ................................ 156/308.2, 298, 156/230, 234, 235, 236, 240, 247; 430/18, 107, 126; 428/206, 207, 209, 210

[56] References Cited

U.S. PATENT DOCUMENTS

| | | | |
|---|---|---|---|
| 2,661,289 | 12/1953 | Mayo et al. | 95/1.9 |
| 2,855,324 | 10/1958 | Van Dorn et al. | 117/25 |
| 3,716,360 | 2/1973 | Fukushima et al. | 96/1.4 |
| 3,928,710 | 12/1975 | Arnold et al. | 428/483 |
| 3,999,481 | 12/1976 | Sankus, Jr. | 101/451 |
| 4,006,050 | 2/1977 | Hurst et al. | 156/234 |
| 4,025,339 | 5/1977 | Kuehnle | 96/1.5 |
| 4,064,285 | 12/1977 | Mammino | 427/24 |
| 4,337,303 | 6/1982 | Sahyun et al. | 430/11 |
| 4,510,225 | 4/1985 | Kuehnle et al. | 430/126 |
| 4,529,650 | 7/1985 | Martinez | 428/336 |
| 4,737,224 | 4/1988 | Fitzer et al. | 156/240 |
| 4,923,847 | 5/1990 | Ito et al. | 503/227 |
| 4,927,727 | 5/1990 | Rimai et al. | 430/99 |
| 4,968,578 | 11/1990 | Light et al. | 430/126 |
| 4,983,487 | 1/1991 | Gilreath | 430/126 |
| 5,087,536 | 2/1992 | Aslam et al. | 430/13 |
| 5,106,710 | 4/1992 | Wang et al. | 430/42 |

FOREIGN PATENT DOCUMENTS

| | | | |
|---|---|---|---|
| 0 518 138 A1 | 12/1992 | European Pat. Off. | G03G 7/00 |
| 0 623 475 A1 | 11/1993 | European Pat. Off. | B41M 5/35 |
| 2 085 806 | 10/1981 | United Kingdom | G03G 19/00 |

OTHER PUBLICATIONS

Stange,B., COLORBUS CopiPress Press release, Colorbus, Inc. 18261 McDurmott West, Irvine, CA 92714, Nov. 7, 1994.

Primary Examiner—Jenna Davis
Attorney, Agent, or Firm—Whyte Hirschboeck Dudek S.C.

[57] ABSTRACT

Rigid signs are prepared by a facile method of fixing an image to a rigid substrate coated with a thermally tackifiable coating. The image is readily produced through the use of a computer graphics program, and the image is printed onto a transfer film using a conventional computer printer. The image-bearing surface of the transfer film is then joined in pressing contact with the thermoplastic coating which has been warmed to a softened or tacky state. Upon cooling the thermoplastic coating to a hard, durable state, the transfer film is removed leaving the image securely affixed to the rigid substrate.

21 Claims, 1 Drawing Sheet

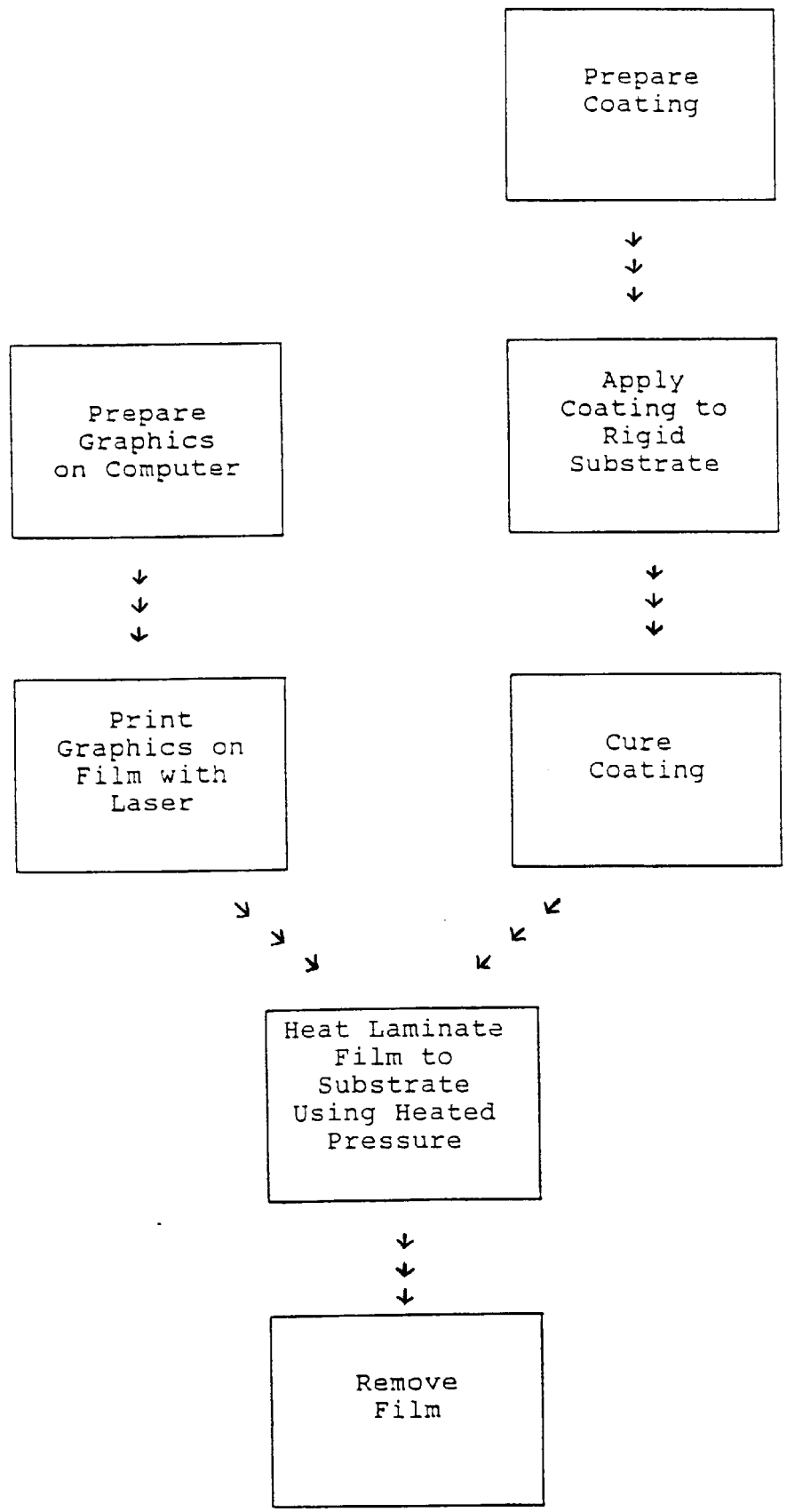

the aluminum sheet.

METHOD OF FIXING AN IMAGE TO A RIGID SUBSTRATE

CROSS-REFERENCE TO RELATED APPLICATION

This is a continuation-in-part of U.S. Ser. No. 08/116,341 filed on Sep. 3, 1993, now abandoned which is hereby incorporated herein by reference.

BACKGROUND OF THE INVENTION

This invention relates to signs. In one aspect, the invention relates to a method of producing a sign by fixing an image to a rigid substrate while in another aspect, the invention relates to a method in which the image is first printed by electrophotography onto a transfer film in an optically reversed manner and the rigid substrate is coated with a thermally tackifiable substance. In yet another aspect, the invention relates to a method for producing small batches of rigid signs in a facile, quick and inexpensive manner.

Rigid signs comprise an image carried on an inflexible substrate. Such signs are often used in an outdoor setting in which durability of the image is an important quality of the sign.

Rigid signs are typically produced in low volumes, e.g. less than 100 signs at a time, and are typically made by a silk screen printing process. While this process produces rigid signs with acceptable quality, silk screening is not cost effective for small production runs. Silk screening is time consuming and by its very nature, precludes quick order completion. At the moment, a good method does not exist for the rapid preparation of small volume production runs of surface-printed rigid signs.

SUMMARY OF THE INVENTION

According to this invention, surface-printed rigid signs bearing a durable image are produced by a method of fixing the image to a rigid substrate coated with a thermoplastic coating which is hard and durable under conditions of use such that the fixed image does not require an over-laminate for durability, the method comprising:

A. Providing an image comprising a transfer substance deposited upon a surface of a transfer film in an optically reversed manner;

B. Applying the image-bearing surface of the transfer film to the thermoplastic coating of the rigid substrate;

C. Joining the transfer film and the thermoplastic coating in pressing contact at an elevated temperature such that the image on the transfer film is transferred to the thermoplastic coating;

D. Cooling the thermoplastic coating; and

E. Removing the transfer film from the thermoplastic coating such that the transfer substance in the form of the image remains durably affixed to the thermoplastic coating.

In one embodiment of this invention, the image is constructed on a personal computer, laser printed in an optically reversed manner on a transfer film such as a sheet of polyethylene terephthalate, the film (image-side down) overlaid on an enameled aluminum sheet coated with a thermoplastic, the overlay passed through two heated pressure rollers and upon cooling, the transfer film removed from the aluminum sheet leaving a durable toner image affixed to the thermoplastic coating of the aluminum sheet. This method lends itself well to the production of small numbers of rigid signs in a short period of time.

BRIEF DESCRIPTION OF THE DRAWING

The FIGURE is a flow diagram of one embodiment of the invention.

DESCRIPTION OF THE PREFERRED EMBODIMENT

The image can be affixed to the transfer film in any convenient manner. Typically, the image, i.e. any graphic such as one or more letters, numbers, symbols, pictures, and the like, is designed on a computer and then printed in an optically reversed manner with a conventional electrophotographic toner on the transfer film. "In an optically reversed manner" means that the image on the transfer film is inverted in such a manner that after transfer to the rigid substrate, it appears in right-reading form. Many computer programs, such as Instant Artist™ by Autodesk, Paintbrush™ as supplied in Windows® Version 3.1 (Microsoft), Corel Draw™ 5.0 from Corel Corp., Quark Xpress™ from Quark, Inc., and Cricket Paint™ Version 1.0 (Computer Associates) contain features that allow an image to be prepared in a right-reading form on a computer monitor which can then be optically reversed for printing purposes.

Any material that will form an image on a transfer film (otherwise known as a release or tight release film), and will transfer from the film to a rigid substrate when the two are joined in pressing contact with one another at an elevated temperature, can be used in the practice of this invention. Typically and preferably, the transfer substance is any one of the commercially available dry powdered toners that are used in conventional computer printers, e.g. HP-Laser Jet IV™, Xerox 4700™, Canon CLC 500™, QMS PS 2000™. These dry powder toners can be any color, including black, white and any shade of gray, and these toners are used in their conventional manner. Representative toners include those used in the above printers, as well as those used in conventional electrophotographic copiers, such as the Canon CLC 300™, Panasonic FP-C1™, Minolta EP 410-Z™, Minolta EP 4320™.

The transfer film that is used in this invention is characterized by the ability of the toner to affix to it in a manner that will allow easy and near complete removal of the toner to a rigid substrate coated with a thermoplastic resin when the two are joined with one another in pressing contact at an elevated temperature. These films are constructed of a material that will not melt or otherwise deform under the conditions at which the image is imposed upon the film. Other physical and chemical characteristics of the film can vary to convenience, but typically the physical dimensions of the film are chosen to accommodate the procedure and equipment used to impose the image on the film. For example, in those applications in which a conventional laser printer is used to impose the image upon the film, the physical dimensions of the film are one of the paper sizes for which the printer is designed to accommodate, usually with a thickness between 3 and 6 mils. Representative of the transfer films that can be used in this invention are those constructed of polyester (e.g. polyethylene terephthalate (clear or pigmented) coated with a release agent or uncoated), polyolefin coated paper (e.g. polyethylene coated paper), paper coated with one or more release agents (typically silicone-based), oriented polypropylene, and the like. Among the preferred release films are those containing titanium dioxide as a pigment and those coated with an antistatic material.

The amount of toner that is releasably affixed to the tight release film can also vary to convenience, although it is typically an amount similar to that which is transferred by a conventional computer printer to a sheet of paper during a normal printing operation. Usually, essentially complete transfer of the transfer substance (e.g. toner) from the tight release film to the rigid substrate is desirable and as such, the maximum amount of toner deposited on the film does not exceed the maximum amount of toner that the rigid substrate can effectively receive during the transfer operation. Similarly, the minimum amount of toner deposited on the film is the minimum amount of toner required to impart the desired image on the rigid substrate. These amounts will vary with the nature of the transfer substance, tight release film, thermoplastic coating on the rigid substrate, and the transfer conditions (e.g. pressure, temperature, etc.).

Any rigid substrate to which a thermoplastic coating will securely adhere, the thermoplastic coating exhibiting good durability under conditions of use and to which the transfer substance will securely affix, can be used in the practice of this invention. Preferred substrates are characterized not only by their rigidity, but by sufficient polar functionality that the thermoplastic coating will securely bond to it upon application and cure. Those rigid substrates that do not possess such polar functionality can be adapted to receiving a suitable thermoplastic coating by surface modification, e.g. chemical etching, plasma treatment, etc., or by prior treatment with any suitable tie-layer, e.g. a primer. Preferred rigid substrates include polycarbonate (e.g. Lexan™, a polycarbonate manufactured and sold by GE Plastics), metal (e.g. aluminum, steel, brass, etc.), enamel-coated metal (e.g. enameled aluminum, etc.), polystyrene, any of the commercially available acrylic resins (i.e. thermoplastic polymers or copolymers of acrylic acid, methacrylic acid, esters of these acids, and acrylonitrile), fiberglass reinforced acrylic (e.g., Lumasite™ from American Acrylic), acrylonitrile/styrene/acrylate (e.g., Luran S™ from Allen Extruders), cellulose acetate butyrate, acrylonitrile/butadiene/styrene (ABS), nylon, glass, wood, polyethyleneterephthalate-G, treated polyethylene and treated poly (vinyl) chloride (in which "treated" means that the surface to which the thermoplastic coating is applied has been modified by any suitable means to improve the adhesion between the substrate and the coating), and the like. The rigid substrate can be of any length, width and thickness. Preferably, the rigid substrate has a surface area greater than 150 cm$^2$ and preferably has a thickness greater than that of the thermoplastic coating, more preferably at least 0.6 mm.

The rigid substrate is coated with a thermoplastic resin that provides a hard, durable surface under conditions of use but when subjected to an elevated temperature, softens and becomes receptive to the transfer substance. Sufficient thermoplastic resin is applied to the substrate such that the coating will receive and firmly affix the transfer substance to the substrate. Typically, this coating is at least 0.5, and preferably at least 1.0 mil in thickness. Thicker coatings can be used with the only limitations on the maximum thickness being those of convenience and economy.

The composition of the coating, like that of the substrate, can vary widely, and includes both solvent and water-based resins and UV curable materials. For reasons of easy application, UV-curable resins of 100 percent solids are preferred. Representative water-based materials include such materials as RES 3103™, RES 3016™ and RES 6107™ vinyl acrylic latexes; RES 202-AM™ and RES 6213™ vinyl acetate homopolymer latexes and RES 6304™, RES 6510™ and RES 3112™ acrylic latexes, all from Rohm and Haas Co. Representative solvent-based materials include acrylic resins, such as B-66™ and B-67™ acryloid resins (Rohm and Haas), or Elvacite™ resin (grade 2044 from E. I. Du Pont de Nemours Co.). The choice of resin for any given application is determined in large part by the performance characteristics required of the rigid sign, e.g. non-yellowing components are selected for clear coatings, acrylics for superior water and solvent resistance, and the like. The resins can be applied as a coating to the rigid substrate in any conventional manner, e.g. roll coating, spraying, brushing, screen printing, dip coating, curtain coating, etc.

The image on the transfer film is transferred to the thermoplastic resin coated rigid substrate by joining the film and substrate in a manner such that the image bearing surface of the film is joined in pressing contact with the thermoplastic resin coated surface of the substrate to form a laminate, heating the laminate to a temperature at which the thermoplastic resin coating softens or becomes tacky relative to the transfer film, cooling the laminate to a temperature at which the thermoplastic resin coating returns to a hard, durable state (i.e. non-tacky relative to the transfer film), and then removing or delaminating the transfer film from the substrate. During the pressing contact of the transfer film and thermoplastic resin coating at the elevated temperature, the transfer substance or toner affixes to the coating in such a manner that upon cooling, the substance or toner remains securely affixed to the hardened coating and releases from the film when the latter is removed from the former. Preferably, the transfer film and thermoplastic resin coating are brought into pressing contact with one another by means of heated press rollers such that the only area of the laminate that experiences both elevated temperature and pressure is that between the press rollers. Under these conditions, the elevated pressure and temperature experienced by the laminate is relatively short, e.g. less than a few seconds. The temperature and pressure of the transfer process will, of course, vary with the other method variables, particularly with the composition of the thermoplastic coating and transfer film. The elevated temperature is, however, preferably below the softening temperature of the rigid substrate.

In a preferred embodiment, the transfer process is conducted using a pair of heated pressure rollers comprising top and bottom pinch rollers in which the top pinch roller is in heat and pressure contact with the transfer film side of the rigid substrate and the bottom pinch roller is in pressure contact with the side of the rigid substrate opposite the transfer film side. Preferably, the top pinch roller is heated to a temperature above the softening point of the thermoplastic coating and the bottom pinch roller is at a temperature below the softening temperature of the thermoplastic coating. The bottom pinch roller is preferably at a temperature at least 20° C. less than the temperature of the top pinch roller.

The transfer process using heated press rollers is preferred, because it results in good image transfer and a durable image while avoiding undue warpage of heat sensitive substrates due to heating and cooling the substrate, and it is a convenient way to make signs in high volume. Undue warpage is defined herein to mean a warpage greater than 2 mm measured by placing the finished sign on a flat surface, such as a sheet of glass, so that any curl due to warpage is oriented concave up, pushing one edge of the sign flat against the flat surface and measuring the distance between the flat surface and the opposite edge of the sign.

The invention is further described by reference to the FIGURE which describes an embodiment in which a rigid sign with durable graphics is produced in a quick, facile manner. In this embodiment, the graphics for the rigid sign are first designed and produced on a computer through the use of a graphics program. The graphics (image) is optically reversed through the use of a feature of the program designed for such a purpose. The optically reversed graphic is then printed on a transfer film using a laser printer and a conventional dry powder toner.

Separately, a thermoplastic resin is prepared and then applied as a coating to a rigid substrate using any conventional technique, e.g. a draw down roller bar. The coating is then cured or dried in a manner consistent with its formulation, e.g. in an oven if it is solvent or water-based or is thermally curable, or in a UV curing unit if it contains a photoinitiator and photopolymerizable components. The graphics bearing surface of the transfer film is laid atop the coating bearing surface of the rigid substrate, and the resulting laminate is fed through two heated pressure rollers, and allowed to cool under ambient conditions to room temperature, and the tight release film removed from the coating-bearing surface of the rigid substrate. The resulting product is a rigid sign bearing the graphics in a right reading form, the graphics durably affixed to the thermoplastic coating of the rigid substrate.

The following examples are illustrative of specific embodiments of this invention. Unless indicated to the contrary, all parts and percentages are by weight.

SPECIFIC EMBODIMENTS

Example 1

Water-based coating. An aluminum sheet (6" by 10") with a white enamel coating was obtained from Alliance Company. This sheet was coated with a vinyl acrylic latex from Rohm and Haas (RES 3103™ (Tg=13 C)) using a #16 wire wound rod. The coating was dried under mild heat to a nontacky (to the human touch) film.

Sign graphics were designed and optically reversed using the drawing program supplied with Windows 3.1. The image was printed onto paper with the use of a Hewlett Packard LaserJet III™ printer. The resultant image was copied through the use of a Minolta EP 410-Z™ copier on to the release side of a silicone release-coated polyester sheet (8½" by 11" by 3 mil) obtained from Custom Coatings and Laminating Corporation (C/1/S 6020). Optionally, the graphics can be printed directly onto the film using the laser printer.

The image-bearing film was placed, toner-side down, onto the coated side of the rigid substrate. The laminate was then run between two pressure rollers set at 50 pounds per square inch and heated to 100° C. at a speed of 5 sec/in. Upon cooling to room temperature, the film was removed. The toner image remained securely affixed to the coating on the rigid substrate, thus producing a rigid sign. The image was not merely on the surface of the coating, but was integral to the coating.

Example 2

Water-based coating. The procedure of Example 1 was repeated except that an acrylic latex from Rohm and Haas (RES 3512™(Tg=26 C)) was substituted for the vinyl acrylic latex designated RES 3103™. This coating produced results similar to those in Example 1, i.e. a rigid sign with a durably affixed graphic.

Example 3

UV-curable coating. The procedure of Example 1 was repeated with the exception that the coating on the rigid substrate was a UV-curable formulation, not a latex. The coating of this Example was prepared from Acryloid B-66™ (55 g, an acrylic resin from Rohm and Haas), SR 268™ (110 g, tetraethylene glycol diacrylate from Sartomer), and Irgacure 184™ (4.13 g, a photoinitiator from Ciba-Giegy Corp.). This coating composition was applied to a white-enameled aluminum substrate with a number 8 wire wound rod, and the coating was allowed to level for a minute before curing with one medium pressure mercury lamp in a Fusion Systems curing unit (3 passes at 30 ft/min). After heat transferring the toner under the above conditions, the resultant rigid sign proved to be scratch resistant.

Example 4

Solvent-based coating. An acrylic resin, B-66™ (40 g) from Rohm and Haas, was dissolved in toluene (100 g), and coated onto a white-enameled aluminum sheet (8"×10"× 0.025") with a #24 wire-wound rod. The coating was air-dried for two hours.

An A-size sheet of clear, untreated polyester film (4.23 mil, Melinex Type 3285™ from ICI Americas Inc.) was printed in an optically-reversed fashion in a Hewlett-Packard Laser Jet IV™ with an image designed on an IBM compatible 386 PC with the graphics program, Instant Artist™ (Autodesk).

The film was placed, toner-side down, onto the dried acrylic coating of the rigid substrate and run between two heated (120 C) rubber pressure rollers at a speed of 8 sec/in. and a pressure of 50 psi. Upon cooling, the film was removed from the composite, yielding a finished sign with the graphics securedly affixed to the hard, durable acrylic coating.

Example 5

The following formulation was screen printed onto white-enameled aluminum with a 235 mesh screen:

| Rohm & Haas | Acryloid B-66 ™ | 86.7 g |
| --- | --- | --- |
| Sartomer | SR-268 ™ acrylate monomer | 186.0 g |
| Sartomer | SR-9015 ™ acrylate monomer | 62.1 g |
| Ciba-Geigy | Irgacure-184 ™ | 9.3 g |
| Dow-Corning | DC-56 ™ silicone surfactant | 3.4 g |
| Dow-Corning | DC-11 ™ silicone surfactant | 3.4 g |

The resultant UV-curable coating was then cured by two medium-pressure mercury bulbs at an exposure of 2060 mJ/cm2.

An optically-reversed graphics image was printed onto A-size white, untreated polyester (4 mil, Melinex Type 329™ from ICI). This sheet was coupled to the rigid sign and pressure/heat developed under the conditions described in Example 4. Upon removal of the film, a completed sign was obtained.

Example 6

A sheet of white polyester (Melinex Type 329™) was printed with a color image in a Xerox 4700™ color eletrophotographic printer/copier. This film was developed against a sheet of coated aluminum panel, prepared as in Example 5. Removal of the film yielded a completed color sign.

Example 7

The following formulation was coated onto various rigid substrates with a #8 wire wound rod and the resultant UV-curable coating cured at 2060 mJ/cm2 with two medium-pressure mercury lamps:

| Rohm and Haas | B-66 ™ acrylic resin | 66.6 g |
|---|---|---|
| Sartomer | SR-268 ™ acrylic monomer | 100.0 g |
| Sartomer | SR-9015 ™ acrylate monomer | 33.4 g |
| Ciba-Geigy | Irgacure 184 ™ | 5.0 g |

Substrate: a. 125 mil yellow acrylic b. 125 mil white acrylic c. 80 mil white polystyrene d. 15 mil polished brass e. 120 mil clear poly(carbonate)

f. 110 mil clear cellulose acetate butyrate

Each of the resultant coated substrates were pressure/heat developed against a 4 mil PET transfer sheet (Melinex Type 329™) which had been reverse-printed in a Hewlett Packard Laser Jet IV™ printer. Upon cooling and removal of the film from the composite, a scratch-resistant rigid sign was obtained.

Comparative Example 1

The following substrates were obtained and prepared to examine their behavior under heat assisted toner transfer with and without a thermoplastic coating:

Polystyrene (254×355×1.6 mm) (Midland Plastics)

Polystyrene laminated with 2 mil white vinyl (W. H. Brady Co.)

ABS (216×280×1.7 mm) (Cadillac Plastics)

Cellulose Acetate Butyrate (128×153×3.21 mm)

Half of each of the substrate types was screen coated with the following formulation (230 mesh screen):

| B-66 ™ (acrylic resin from Rohm & Haas) | 495.47 g |
|---|---|
| SR-268 ™ (acrylate monomer from Sartomer) | 1063.29 g |
| SR-9015 ™ (acrylate monomer from Sartomer) | 355.11 g |
| Irgacure 184 ™ (photoinitiator from Ciba-Geigy) | 47.85 g |
| DC-56 ™ (surfactant from Dow-Corning) | 19.14 g |
| DC-11 ™ (surfactant from Dow-Corning) | 19.14 g |

The coated sheets were cured on a Fusion Systems UV curing unit at 2800 mJ/cm2.

Images were produced on polyester transfer sheets on a Hewlett Packard LaserJet IV™ printer (hereafter HP LaserJet IV™ printer). The transfer sheets consisted of 5 mil white polyester (329 Melinex™ from ICI America) which had been coated with the following mixture with a #18 wire-wound bar:

| Isopropyl Alcohol | 4000.0 g |
|---|---|
| Markstat AL-26 ™ (antistat from Witco) | 0.8 g |

The toner images were placed face-down on the coated and uncoated substrates. One set of substrates was developed on a set of XRL-180™ Western Magnum laminating rollers (50 psi, 0.7 ft/minute). The set temperature of the top roller was varied from 90 to 150 C. The actual temperature of the roller was measured with a thermocouple. The substrates were allowed to cool for five minutes after development and the transfer sheet removed to yield a finished sign.

A second set of substrates was pressure developed on a heated platen press (Wabash Hydraulic Press, Model 50-24-2TMAC). The pressure was set at 10,000 lb and the dwell time under pressure was set at 6 seconds. The top plate was heated. Again, the temperature was measured with a thermocouple.

After sitting at room temperature for 48 hours, the resultant signs were judged on three criteria. The goodness of toner transfer to the substrate was judged on a 5 point scale, with 0 being no toner transfer and 4 being perfect transfer. The adhesion of the toner to the substrate was judged on a 4 point scale, with 1 denoting no resistance to fingernail scratching and 4 denoting full resistance. The degree of warpage was measured by placing the finished sign on a sheet of flat glass so that any curl due to warpage was concave up, pushing one edge of the sign flat against the glass, and measuring the distance between the glass and the opposite edge of the sign. More than 2 mm was found to be an objectionable amount of warpage. The results are summarized in Tables 1 to 7 below.

TABLE 1

Polystyrene - Midland Plastic
Size 355 mm × 254 mm
Western Magnum Rollers

| COATED | | | | UN-COATED | | | |
|---|---|---|---|---|---|---|---|
| Temp. (C.) | Scratch | Image | Curl | Temp. (C.) | Scratch | Image | Curl |
| 166 | 4 | 4 | 10 mm | 166 | 3 | 4 | 14 mm |
| 165 | 4 | 4 | 5 mm | 165 | 2 | 4 | 11 mm |
| 163 | 4 | 4 | 2 mm | 163 | 2 | 4 | 10 mm |
| 159 | 4 | 4 | 1 mm | 159 | 2 | 4 | 2 mm |
| 154 | 4 | 4 | 0 | 154 | 1 | 2 | 0 |
| 150 | 4 | 4 | 0 | 150 | 1 | 1 | 0 |
| 146 | 4 | 4 | 0 | 146 | 1 | 1 | 0 |
| 136 | 3.5 | 4 | 0 | 136 | 1 | 1 | 0 |
| 132 | 2 | 3 | 0 | 132 | 0 | 0 | 0 |
| 127 | 3 | 3 | 0 | 127 | 0 | 0 | 0 |
| 120 | 2 | 2 | 0 | 120 | 0 | 0 | 0 |
| 115 | 2 | 2 | 0 | 115 | 0 | 0 | 0 |
| 109 | 1 | 1 | 0 | 109 | 0 | 0 | 0 |

TABLE 2

Polystyrene - Midland Plastic
Overlaminate - B-946 (vinyl)
Size - 355 mm × 254 mm

| COATED | | | | UN-COATED | | | |
|---|---|---|---|---|---|---|---|
| Temp. (C.) | Scratch | Image | Curl | Temp. (C.) | Scratch | Image | Curl |
| 166 | 4 | 4 | 1 mm | 166 | 1 | 4 | 1 mm |
| 165 | 4 | 4 | 0 | 165 | 1 | 4 | 0 |
| 163 | 4 | 4 | 0 | 163 | 1 | 4 | 0 |
| 159 | 4 | 4 | 0 | 159 | 1 | 4 | 0 |
| 154 | 4 | 4 | 0 | 154 | 1 | 4 | 0 |
| 150 | 3 | 4 | 0 | 150 | 1 | 4 | 0 |
| 146 | 3 | 4 | 0 | 146 | 1 | 3 | 0 |
| 136 | 3 | 4 | 0 | 136 | 1 | 3 | 0 |
| 132 | 2 | 4 | 0 | 132 | 1 | 3 | 0 |

TABLE 3

ABS - Cadillac Plastic
Size 280 mm × 216 mm

| COATED | | | | UN-COATED | | | |
|---|---|---|---|---|---|---|---|
| Temp. (C.) | Scratch | Image | Curl | Temp. (C.) | Scratch | Image | Curl |
| 166 | 4 | 4 | 9 mm | 166 | 2 | 4 | 12 mm |
| 165 | 4 | 4 | 7 mm | 165 | 2 | 4 | 12 mm |
| 163 | 4 | 4 | 12 mm | 163 | 2 | 4 | 3 mm |
| 159 | 4 | 4 | 2 mm | 159 | 2 | 4 | 9 mm |
| 154 | 4 | 4 | 0 | 154 | 2 | 4 | 2 mm |
| 150 | 3 | 4 | 0 | 150 | 1 | 1 | 1 mm |
| 146 | 3 | 4 | 0 | 146 | 1 | 2 | 0 |

TABLE 4

Cellulose Acetate Butyrate (CAB)
Size 153 mm × 128 mm
Western Magnum Rollers

| COATED | | | | UN-COATED | | | |
|---|---|---|---|---|---|---|---|
| Temp. (C.) | Scratch | Image | Curl | Temp. (C.) | Scratch | Image | Curl |
| 165 | 4 | 4 | 3 mm | 165 | 1 | 1 | 3 mm |
| 163 | 4 | 4 | 2 mm | 163 | 1 | 1 | 2.5 mm |
| 159 | 3 | 4 | 1.5 mm | 159 | 1 | 1 | 2 mm |
| 154 | 2 | 3 | .5 mm | 154 | 1 | 1 | .5 mm |
| 150 | 1 | 3 | 0 | 150 | 1 | 1 | 0 |
| 146 | 1 | 1 | 0 | 146 | 0 | 0 | 0 |
| 136 | 1 | 1 | 0 | 136 | 0 | 0 | 0 |

TABLE 5

Polystyrene-Midland Plastic
Size 355 mm × 216 mm
Platen Press

| COATED | | | | UN-COATED | | | |
|---|---|---|---|---|---|---|---|
| Temp. (C.) | Scratch | Image | Curl | Temp. (C.) | Scratch | Image | Curl |
| 158 | 4 | 2 | 79 mm | 158 | 4 | 2 | 45 mm |
| 149 | 4 | 2 | 40 mm | 149 | 4 | 2 | 45 mm |
| 145 | 4 | 2 | 50 mm | 145 | 3 | 2 | 55 mm |
| 140 | 4 | 2 | 58 mm | 140 | 2 | 1 | 7 mm |
| 131 | 3 | 1 | 33 mm | 131 | 1 | 1 | 25 mm |
| 120 | 4 | 0 | 5 mm | 120 | 1 | 0 | 8 mm |
| 111 | 3 | 0 | 1 mm | 111 | 1 | 0 | 2 mm |
| 100 | 2 | 0 | 0 | 100 | 1 | 0 | 0 |
| 92 | 2 | 0 | 0 | 92 | 1 | 0 | 0 |
| 82 | 1 | 0 | 0 | 82 | 1 | 0 | 0 |

TABLE 6

Polystyrene - Midland Plastic
Overlaminate - B-946 (vinyl)
Size 355 mm × 254 mm
Platen Press

| COATED | | | | UN-COATED | | | |
|---|---|---|---|---|---|---|---|
| Temp. (C.) | Scratch | Image | Curl | Temp. (C.) | Scratch | Image | Curl |
| 175 | 4 | 2 | 8 mm | 175 | 2 | 2 | 6 mm |
| 164 | 4 | 2 | 28 mm | 164 | 2 | 2 | 25 mm |
| 154 | 4 | 2 | 1 mm | 154 | 2 | 2 | 5 mm |
| 146 | 4 | 1 | 13 mm | 146 | 2 | 1 | 5 mm |
| 134 | 4 | 1 | 3 mm | 134 | 1 | 1 | 1 mm |
| 125 | 4 | 1 | 0 | 125 | 1 | 1 | 5 mm |
| 117 | 4 | 1 | 0 | 117 | 1 | 1 | 0 |
| 103 | 3 | 1 | 0 | 103 | 1 | 1 | 0 |
| 93 | 2 | 1 | 0 | 93 | 1 | 1 | 0 |
| 84 | 1 | 1 | 0 | 84 | 1 | 1 | 0 |

TABLE 7

CAB
Size 153 mm × 128 mm
Platen Press

COATED

| Temp.(C.) | Scratch | Image | Curl |
|---|---|---|---|
| 175 | 4 | 2 | 12 mm |
| 164 | 4 | 2 | 8 mm |
| 154 | 4 | 2 | 8 mm |
| 146 | 4 | 2 | 6 mm |
| 134 | 4 | 2 | 5 mm |
| 125 | 4 | 2 | 3 mm |
| 117 | 4 | 1 | 1 mm |
| 103 | 4 | 1 | 0 |
| 93 | 3 | 1 | 0 |
| 84 | 2 | 1 | 0 |

UN-COATED

| Temp.(C.) | Scratch | Image | Curl |
|---|---|---|---|
| 175 | 2 | 2 | 12 mm |
| 164 | 2 | 2 | 7 mm |
| 154 | 1 | 2 | 8 mm |
| 146 | 1 | 2 | 7 mm |
| 134 | 1 | 0 | 3 mm |
| 125 | 1 | 0 | 2 mm |
| 117 | 1 | 0 | 1 mm |
| 103 | 1 | 0 | 1 mm |
| 93 | 1 | 0 | 0 |
| 84 | 1 | 0 | 0 |

In no case was the scratch resistance of the toner for uncoated signs good enough for commercial use at a temperature which gave an acceptable degree of warpage. The uncoated signs only began to give acceptable scratch resistance under conditions of very high warpage. The scratch resistance of the coated signs, on the other hand, was very good under non-warping conditions. The transfer of toner to all of the signs did not occur completely under any conditions for the heated platen. These experiments indicate that, in order for acceptable signs to be made by thermally-assisted transfer of toner to a plastic sign substrate, that the substrate must have a thermoplastic coating and the transfer must occur with pressure rollers.

Comparative Example 2

The following experiments show the effects of substrate size on the results obtained with a platen press using polystyrene which was uncoated, laminated with 2 mil white vinyl or coated with a thermoplastic coating. Preparation of these sheets was as described above. Using 254×355×1.6 mm polystyrene sheets, samples were cut in half in a series of cuts in order to make sign substrates of the following dimensions:

| Substrate # | Size (mm) |
| --- | --- |
| 1 | 254 × 355 |
| 2 | 178 × 254 |
| 3 | 127 × 178 |
| 4 | 89 × 127 |
| 5 | 63 × 89 |

Toner images were produced on white PET in the same matter as in Comparative Example 1 and developed on a heated platen press (Wabash Hydraulic Press, Model 50-24-2TMAC). The samples were run with the bottom plate not heated and the top plate heated to a surface temperature of either 133 or 160 C. The pressure was set at 10,000 lb and the dwell time under pressure set at 6 seconds. Each resultant image was judged according to scratch resistance, completeness of transfer, and degree of curl using the same criteria as in Comparative Example 1. The results are shown in Table 8 below.

TABLE 8

Polystyrene - Midland Plastic
Overlaminate - B 946 (vinyl)
Polystyrene Size Study
Platen Press

| Substrate# | Scratch | Image | Curl | Substrate# | Scratch | Image | Curl |
| --- | --- | --- | --- | --- | --- | --- | --- |
| COATED 133 C | | | | COATED 163 C | | | |
| 1 | 2 | 2 | 20 mm | 1 | 3 | 2 | 40 mm |
| 2 | 2 | 2 | 17 mm | 2 | 3 | 2 | 18 mm |
| 3 | 2 | 2 | 10 mm | 3 | 3 | 2 | 11 mm |
| 4 | 2 | 2 | 2 mm | 4 | 3 | 2 | 8 mm |
| 5 | 2 | 2 | 1 mm | 5 | 3 | 2 | 3 mm |
| OVERLAMINATED 133 C | | | | OVERLAMINATED 163 C | | | |
| 1 | 1 | 1 | 4 mm | 1 | 1 | 1 | 22 mm |
| 2 | 1 | 1 | 6 mm | 2 | 1 | 1 | 20 mm |
| 3 | 1 | 1 | 2 mm | 3 | 1 | 1 | 14 mm |
| 4 | 1 | 1 | 2 mm | 4 | 1 | 1 | 2 mm |
| 5 | 1 | 2 | 1 mm | 5 | 1 | 2 | 1 mm |
| NO COATING 133 C | | | | NO COATING 163 C | | | |
| 1 | 1 | .5 | 12 mm | 1 | 2 | 1 | 40 mm |
| 2 | 1 | .5 | 12 mm | 2 | 2 | 1 | 45 mm |
| 3 | 1 | .5 | 4 mm | 3 | 2 | 1 | 24 mm |
| 4 | 1 | .5 | 2 mm | 4 | 2 | 1 | 7 mm |
| 5 | 1 | 1 | 1 mm | 5 | 2 | 2 | 3 mm |

The degree of curl is highly dependent on the size of the plastic substrate. When the substrate is in the size range of a standard credit card (54×85 mm) little curl is seen at the temperatures considered. For standard sign sizes, however, the warpage is substantial. In no case did the toner image transfer on the heated platen as well as under pressure rollers. In each comparative case, the substrates with thermoplastic coating produced a more durable image than those without coating.

Comparative Experiment 3

Three different types of coating were compared: (1) a UV curable, screen printable formulation; (2) a water-based formulation based on a latex dispersion, and (3) a solvent-borne polymer.

The three types of coating were made and applied as below:

UV Curable

This formulation is the same as that applied in Comparative Example 1. It was also applied by screen printing (230 mesh screen)and the coating was cured on a Fusion Systems UV curing unit at 2800 mJ/cm$^2$.

Solvent Based

| B-66 ™ (acrylic resin from Rohm and Haas) | 100 g |
| --- | --- |
| Methyl ethyl ketone | 30 g |

This formulation was applied by coating with a #18 wire wound rod and air drying.

Water Based

Rhoplex P-376™ (50% solids styrenated acrylic latex (Tg=21 C) from Rohm and Haas)

This formulation was applied by coating with a #18 wire wound rod and air drying.

The substrate coated in each case was polystyrene (254× 355 ×1.6 mm) from Midland Plastics which had been overlaminated with 3 mil white pressure-sensitive vinyl (Flexcon ELV-400W™ with acrylic adhesive). Also included in the study were polystyrene which had been laminated with vinyl but not coated and polystyrene which was neither laminated nor coated.

Images were produced on special transfer sheets on an HP LaserJet IV™ black and white printer. The transfer sheets consisted of 5 mil white polyester (329 Melinex™ from ICI Americas, Inc.) which had been coated with the following mixture with a #18 wire wound bar:

| Isopropyl alcohol | 4000.0 g |
| --- | --- |
| Markstat AL-26 ™ (antistat from Witco) | 0.8 g |

The toner images were placed face-down on the receiver substrates. One set of substrates was developed on a set of XRL-180 Western Magnum laminating rollers (50 psi, 0.7 ft/min). Only the top roller was heated, to allow maximal heating of the top surface of the substrate without greatly affecting the bulk of the sheet. The temperature of the top roller, as measured with a thermocouple, was varied from 137 to 181 C. The substrates were allowed to cool for five minutes after development and the transfer sheet removed to yield a finished sign.

A second set of substrates was pressure developed on a heated platen press (Wabash Hydraulic Press, Model 50-24-2TMAC). The pressure was set at 10,000 lbs. and the dwell time under pressure was set at 6 seconds. Only the top plate was heated. Again, the temperature was measured with a thermocouple. The transfer sheets were removed after allowing the sign to cool for five minutes.

After sitting at room temperature for 48 hours, the signs were judged using the same criteria as in Comparative Example 1.

Data for the UV cured coating (UV), the latex coating (water), the solvent borne polymer (solvent), polystyrene overlaminated with vinyl but not coated (none(lam)), and polystyrene with neither coating nor vinyl laminate (none(no lam)) using the platen press is shown in Table 9 and data for the same using laminating rollers is shown in Table 10.

TABLE 9

Platen Press

| Temperature (C.) | Coating | Scratch Resistance | Image Transfer | Curl (mm) |
|---|---|---|---|---|
| 127 | UV | 4 | 1 | 4 |
|  | water | 3 | 2 | 1 |
|  | solvent | 4 | 1 | 0 |
|  | none (lam) | 1 | 1 | 3 |
|  | none (no lam) | 1 | 0 | 7 |
| 136 | UV | 4 | 2 | 3 |
|  | water | 4 | 2 | 4 |
|  | solvent | 4 | 2 | 4 |
|  | none (lam) | 1 | 1 | 3 |
|  | none (no lam) | 1 | 1 | 6 |
| 149 | UV | 4 | 2 | 8 |
|  | water | 4 | 2 | 4 |
|  | solvent | 4 | 2 | 10 |
|  | none (lam) | 2 | 2 | 8 |
|  | none (no lam) | 3 | 2 | 10 |
| 158 | UV | 4 | 2 | 15 |
|  | water | 4 | 2 | 8 |
|  | solvent | 4 | 2 | 13 |
|  | none (lam) | 2 | 2 | 18 |
|  | none (no lam) | 4 | 2 | 110 |
| 167 | UV | 4 | 2 | 18 |
|  | water | 4 | 2 | 13 |
|  | solvent | 4 | 2 | 20 |
|  | none (lam) | 2 | 2 | 35 |
|  | none (no lam) | 4 | 2 | 55 |
| 178 | UV | 4 | 2 | 28 |
|  | water | 4 | 2 | 17 |
|  | solvent | 4 | 2 | 20 |
|  | none (lam) | 2 | 2 | 35 |
|  | none (no lam) | 4 | 2 | 70 |

TABLE 10

Laminating Rollers

| Temperature (C.) | Coating | Scratch Resistance | Image Transfer | Curl (mm) |
|---|---|---|---|---|
| 137 | UV | 3 | 4 | 0 |
|  | water | 4 | 4 | 0 |
|  | solvent | 3 | 4 | 0 |
|  | none (lam) | 1 | 3 | 0 |
|  | none (no lam) | 1 | 0 | 0 |
| 148 | UV | 3 | 4 | 0 |
|  | water | 4 | 4 | 0 |
|  | solvent | 4 | 4 | 0 |
|  | none (lam) | 1 | 3 | 0 |
|  | none (no lam) | 1 | 1 | 1 |
| 157 | UV | 4 | 4 | 0 |
|  | water | 4 | 4 | 0 |
|  | solvent | 4 | 4 | 0 |
|  | none (lam) | 1 | 4 | 0 |
|  | none (no lam) | 1 | 2 | 2 |
| 168 | UV | 4 | 4 | 3 |
|  | water | 4 | 4 | 3 |
|  | solvent | 4 | 4 | 4 |
|  | none (lam) | 1 | 4 | 4 |
|  | none (no lam) | 3 | 4 | 14 |
| 181 | UV | 4 | 4 | 6 |
|  | water | 4 | 4 | 7 |
|  | solvent | 4 | 4 | 5 |
|  | none (lam) | 1 | 4 | 6 |
|  | none (no lam) | 3 | 4 | 20 |

In no case was the scratch resistance of toner for uncoated signs good enough for commercial use at a temperature which gave an acceptable degree of warpage. Each of the three coating types (UV, solvent, or water) gave receiving layers which allowed good scratch resistance at a low transfer temperature, thereby allowing one to avoid warpage. In no case did the platen press yield perfect transfer. The pressure rollers were far superior to the platen press in promoting toner transfer.

Although the invention has been described in considerable detail through the preceding examples, this detail is for the purpose of illustration only. Many variations and modifications can be made by one skilled in the art without departing from the spirit and scope of the invention as described in the following claims.

What is claimed is:

1. A method of fixing an image to a rigid substrate coated with a thermoplastic coating, the coating hard and durable under conditions of use, such that the fixed image does not require any over laminate for durability, the method comprising:
    A. Providing an image comprising a fused, dry powder toner deposited upon a surface of a transfer film in an optically reversed manner;
    B. Applying the image-bearing surface of the transfer film to the thermoplastic coating of the rigid substrate;
    C. Joining the transfer film and the thermoplastic coating in pressing contact at an elevated temperature such that the image on the transfer film is transferred to the thermoplastic coating through the action of heated pressure rollers;
    D. Cooling the thermoplastic coating; and
    E. Removing the transfer film from the thermoplastic coating such that the fused, dry powder toner in the form of the image remains durably affixed to the thermoplastic coating,
wherein the rigid substrate has a surface area greater than 150 cm$^2$ and does not have a warpage greater than 2 mm after removing the transfer film from the thermoplastic coating or the heated pressure rollers comprise a pair of top and bottom pinch rollers in which the top pinch roller is in heat and pressure contact with the transfer film side of the rigid substrate at a temperature above the softening point of the thermoplastic coating and the bottom pinch roller is in pressure contact with the side of the rigid substrate opposite the transfer film side at a temperature below the softening temperature of the thermoplastic coating.

2. The method of claim 1 in which the transfer film has been coated with an antistatic material.

3. The method of claim 1 in which the toner is deposited upon the surface of the transfer film through the action of a laser printer.

4. The method of claim 3 in which the transfer film is selected from the group consisting of polyester film, polyolefin coated paper, paper coated with at least one release agent, and oriented polypropylene.

5. The method of claim 4 in which the transfer film contains titanium dioxide pigment.

6. The method of claim 5 in which the transfer film is polyethylene terephthalate.

7. The method of claim 1 in which the rigid substrate is selected from the group consisting of polycarbonate, metal, enameled metal, polystyrene, an acrylic resin, cellulose acetate butyrate, nylon, glass, wood, polyethylene terephthalate, treated polyethylene, and treated poly(vinyl) chloride.

8. The method of claim 1 in which the rigid substrate is selected from the group consisting of fiberglass reinforced acrylic, acrylonitrile/styrene/acrylate, and acrylonitrile/butadiene/styrene.

9. The method of claim 5 in which the rigid substrate is an enamel-coated metal.

10. The method of claim 7 in which the thermoplastic coating is at least 0.5 mil in thickness.

11. The method of claim 7 in which the thermoplastic coating is at least 1 mil in thickness.

12. The method of claim 10 in which the thermoplastic coating is selected from the group consisting of vinyl acrylic latexes, vinyl acetate homopolymer latexes, and acrylic latexes.

13. The method of claim 12 in which the thermoplastic coating has been cured by UV curing.

14. The method of claim 12 in which the elevated temperature is at least about 100 C.

15. The method of claim 12 in which the transfer film is removed from the thermoplastic coating at room temperature.

16. The method of claim 1 in which the image is first prepared through the action of a computer program.

17. The method of claim 1 in which the elevated temperature is below the softening temperature of the rigid substrate.

18. The method of claim 1 in which the thermoplastic coating has a thickness of at least 1 mil and the rigid substrate has a thickness of at least 0.6 mm.

19. A rigid sign obtainable by the method of claim 18.

20. The method of claim 1 in which lie heated pressure rollers comprise the pair of top and bottom pinch rollers in which the top pinch roller is in heat and pressure contact with the transfer film side of the rigid substance at a temperature above the softening point of the thermoplastic coating and the bottom pinch roller is in pressure contact with the side of the rigid substrate opposite the transfer film side at a temperature below the softening temperature of the thermoplastic coating.

21. The method of claim 1 in which the rigid substrate has a surface area greater than 150 cm$^2$ and does not have a warpage greater than 2 mm after removing the transfer film from the thermoplastic coating.

* * * * *